United States Patent [19]

Reesor

[11] Patent Number: 4,583,439
[45] Date of Patent: Apr. 22, 1986

[54] APPARATUS FOR TINING FOODSTUFFS

[75] Inventor: Lorne J. Reesor, Maple, Canada

[73] Assignee: Weston Bakeries Limited, Toronto, Canada

[21] Appl. No.: 604,773

[22] Filed: Apr. 27, 1984

[51] Int. Cl.$^4$ .......................... B26D 3/28; B26D 4/76
[52] U.S. Cl. ...................................... 83/867; 83/868; 225/97
[58] Field of Search ................ 83/866, 868, 865, 867; 225/93, 95, 96, 97

[56] References Cited

U.S. PATENT DOCUMENTS

| 2,840,129 | 6/1958 | Jovis . |
| 2,979,095 | 4/1961 | Jovis . |
| 3,119,428 | 1/1964 | Katzenstein . |
| 3,192,975 | 7/1965 | Noel . |
| 3,409,115 | 11/1968 | Porcaro . |
| 3,470,978 | 10/1969 | Wagtskjold et al. . |
| 3,538,797 | 11/1970 | Wagtskjold et al. . |
| 3,704,735 | 12/1972 | Noel et al. . |
| 3,733,942 | 5/1973 | Noel . |
| 3,737,084 | 6/1973 | Noel . |
| 3,917,868 | 11/1975 | Tobey et al. . |
| 3,987,948 | 10/1976 | Peters . |
| 4,015,942 | 4/1977 | Terragnoli . |
| 4,159,662 | 7/1979 | Weaver . |
| 4,222,510 | 9/1980 | Kouloumbini et al. . |
| 4,287,801 | 9/1981 | Hanson . |

FOREIGN PATENT DOCUMENTS

| 648188 | 9/1962 | Canada . |
| 692163 | 8/1964 | Canada . |
| 957248 | 11/1974 | Canada . |

Primary Examiner—Donald R. Schran
Attorney, Agent, or Firm—Beveridge, DeGrandi & Weilacher

[57] ABSTRACT

A tining machine capable of tining or perforating Kaiser and onion buns and other similar crusty rolls or loaves (and, with minor modifications, English muffins) serves to produce a product that stays together around its entire diameter thus retaining freshness and which at the same time may be readily pulled apart by the consumer in the general manner of a tine-split English muffin.

23 Claims, 11 Drawing Figures

APPARATUS FOR TINING FOODSTUFFS

BACKGROUND OF THE INVENTION

This invention relates to improved apparatus for tining bakery produced foodstuffs such as Kaiser or onion buns and related crusty rolls or loaves and, with minor modifications, English muffins.

The prior art has provided apparatus for the tining of foodstuffs, particularly English muffins, and the objective of such apparatus is to produce muffins which can be easily hand-opened at the time of consumption and which muffin has the flat rough surface characteristic that is best for grilling and toasting. A muffin which has been properly tined allows the ultimate user to easily open it thus exposing two rough surfaces on halves of equal thickness. Muffins split in this manner, for various reasons, look and taste far better after being toasted than muffins which have been cut with a knife.

In one form of prior art machine for tining muffins, a travelling conveyor is provided for delivering a series of muffins to a tining section to be tined and split. This tining section has first and second groups of tines operating from opposite sides of the conveyor belt with the tines being arranged to traverse the belt so that the tines are brought into interdigitating relationship with one another. As the tines move into interdigitating relation with one another they penetrate the muffins and at the moment of full penetration one set of tines is lifted out of the plane of interdigitation thereby to fractionally tear the muffin interiors. In this machine the length of the tine holder is equal to a predetermined number of muffin diameters. If, for example, the tine holders are ten muffin diameters in length, the conveyor will deliver ten muffins into the tining section. The tines penetrate the muffins, one set of tines is lifted relative to the other to effect the tearing action, following which the tines are withdrawn. The next ten muffins are then delivered to the appropriate spot and the same action is then repeated.

A disadvantage of the above machine is that it provides single stroke penetration of the muffins only and moreover the means for effecting lifting of one set of tines relative to the other to effect internal muffin tearing requires a fairly complex mechanical means as well as fairly complicated control systems all of which greatly increase the initial cost of the machine as well as increasing maintenance costs.

Other forms of muffin tining machines provide for continuous flow of the muffins on a conveyor in a straight line through the machine. The tine assemblies are disposed on opposite sides of the conveyors and the perforating tines are made to move with the muffins at the same speed as the conveyor. In order to accomplish this, the perforating tines are mounted on an endless chain-type arrangement with cam and lever arrangements being provided to impart the necessary lateral motion to the perforating tines. As might be expected, owing to the endless chain type arrangements on which the perforating tines are arranged, the structure is very complex mechanically and thus relatively costly to manufacture with the usual maintenance problems associated with complicated mechanical devices.

A further form of tining machine, which is a somewhat more refined version of the machine referred to immediately above, and which, preferably, receives muffins which have been tined once as by the aforementioned machine, is adapted to provide two-stroke penetration of each muffin from opposite sides. The tining mechanisms are so arranged that a small degree of auto-rotation of the muffin takes place between tining operations. This auto rotation is more or less random with the rotation taking place in one direction, or the other, or possibly not at all in certain cases when the forces on the muffin are essentially balanced. As with the preceding form of machine, the perforating tines are disposed on endless chain type arrangements to provide forward as well as lateral motion. This results in a very complicated mechanism having the cost and maintenance disadvantages referred to above.

Apparatus which overcomes many of the difficulties of the prior art machine, especially insofar as complexity and maintenance problems are concerned, is described in the co-pending Canadian application Ser. No. 435,791 filed Aug. 31, 1983 and commonly assigned herewith. This co-pending application describes a tining apparatus for muffins and related foodstuff which includes a support frame having a conveyor thereon defining an elongated path of travel along which items of foodstuff are conveyed in serially arranged relationship. This conveyor is moved at a selected rate of speed by a conveyor drive. First and second tine sets are mounted at opposite sides of the conveyor in opposing relationship to one another. Each tine set includes a plurality of tine disposed in spaced parallel relation to one another. Tine guide means are also provided for each of the first and second tine sets for guiding the tine in spaced parallel paths lying above the conveyor and fixed relative to the support frame. Each of the above-noted tine sets also has a length measured along the path of travel which is at least equal to a selected plurality of diameters or lengths of the foodstuff item. Tine drive means are provided for advancing and withdrawing the tines of the first and second sets so that the tines move toward and away from one another along their respective paths in timed relationship to the conveyor movement. This timed relationship is such that as each item of foodstuff is carried along the path of travel by the conveyor said tines of said sets enter into and withdraw from each foodstuff items a plurality of times of effect multiple piercing thereof.

SUMMARY OF THE INVENTION

It is a general object of the invention to alleviate the difficulties inherent in the various prior art devices and to provide apparatus which includes improvements over and above the improvements described in the above note co-pending application and which is capable of tining various forms of foodstuff, expecially crusty loaves and rolls rapidly and in a fully automatic manner and which apparatus is also relatively simple in construction as compared to the prior art devices referred to above and which can be maintained at reasonable cost.

It is a further object of the invention to provide a tining machine which is capable of tining or perforating Kaiser and Onion buns and other similar crusty rolls or loaves (and, with minor modifications, English muffins) to produce a product that stays together around its entire diameter thus retaining freshness and which at the same time may be readiy pulled apart by the consumer in the general manner of a tine-split English muffin.

According to one feature of the invention, means are provided for contacting the items of foodstuff as the same are carried along the conveyor, such contacting means being adapted to effect incremental rotation of the foodstuff items about axes normal to the conveyor while they are moving along the path of travel so that the reciporcating tines enter the foodstuff items at angularly spaced locations on each item. In other words, each foodstuff item rotates slightly between each tine penetrating operation. This provides a very effective tining operation.

In the preferred form of the invention the means for contacting the foodstuff and effecting incremental rotation of same includes a plurality of narrow belts extending lengthwise of and above the conveyor. A drive is provided for moving the belts with a speed differential between certain of the belts so as to impart a torque to the foodstuff items and thus effect the incremental rotation of same.

The above noted narrow belts, by contacting selected surfaces of the foodstuff items, serve to stabilize same and prevent random uncontrolled movement of such items while being carried along the path of travel by the conveyor. This helps to ensure that the plane of weakening provided by the tining operation in each foodstuff item is consistently located or positioned from one item of foodstuff to the next. Provision is made for the belts to partially "embrace" the domed upper portions of foodstuff items passing along the conveyor.

Preferably the above-noted belt means are arranged to impart only gentle pressure to the items of foodstuff. This helps to avoid cracking and flaking of the crusty surface of the foodstuff in the case where crusty rolls or loaves are being processed.

In a preferred form of the invention the above-noted conveyor includes a belt arrangement on which the foodstuff items are supported and carried along the path of travel.

As a further feature of the invention, adjustment means are provided for varying the distance between the belt arrangement of the conveyor and the above-noted belt means to thereby accommodate differing heights or sizes of foodstuff while keeping the plane of the tining operation at the vertical center of the product. Suitable means are also provided to adjust the distance between the tine guide means to accommodate differing foodstuff widths.

In the case where crusty rolls or loaves are being tined, the individual tines comprise a somewhat flattened blade having a sharpened end, such as a chisel point.

In the case where English muffins are being tined, the individual tines preferably comprise pointed rod-like elements, the latter being known per se in the art.

Further features and advantages of the invention will come apparent from the following description of a preferred embodiment of the invention taken in conjunction with the appended claims.

BRIEF DESCRIPTION OF THE VIEWS OF DRAWINGS

In drawings which illustrate a preferred embodiment of the invention.

DETAILED DESCRIPTION OF PREFERRED EMBODIMENT

Figure 1:
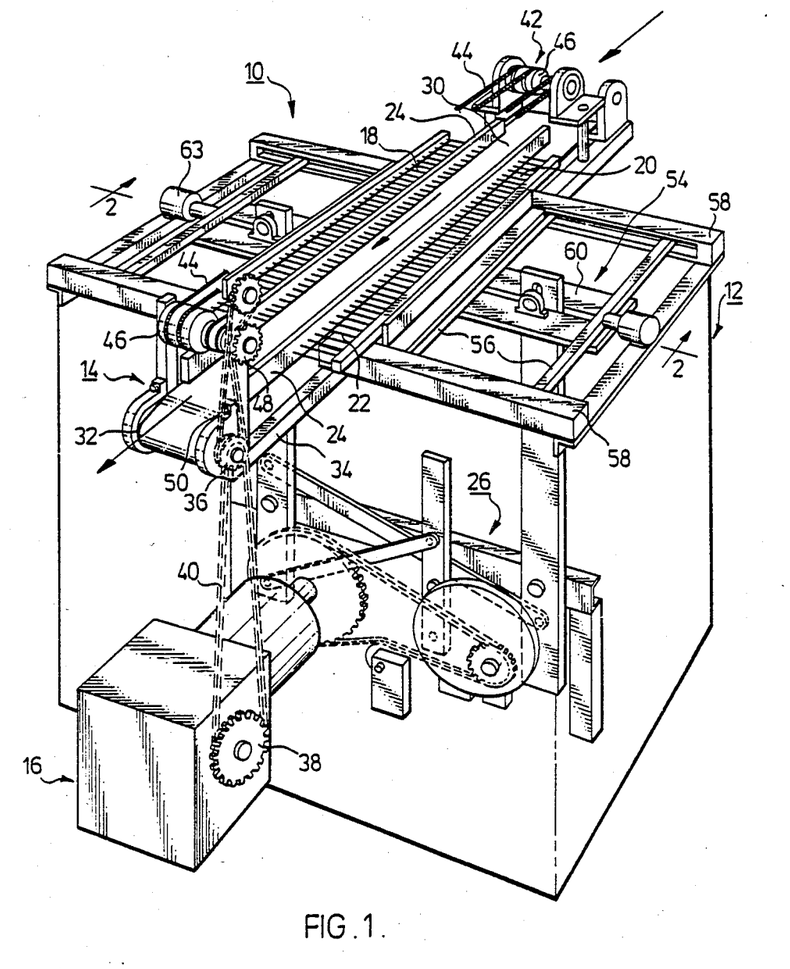
FIG. 1 is a perspective view of tining apparatus according to the invention.
Figure 2:
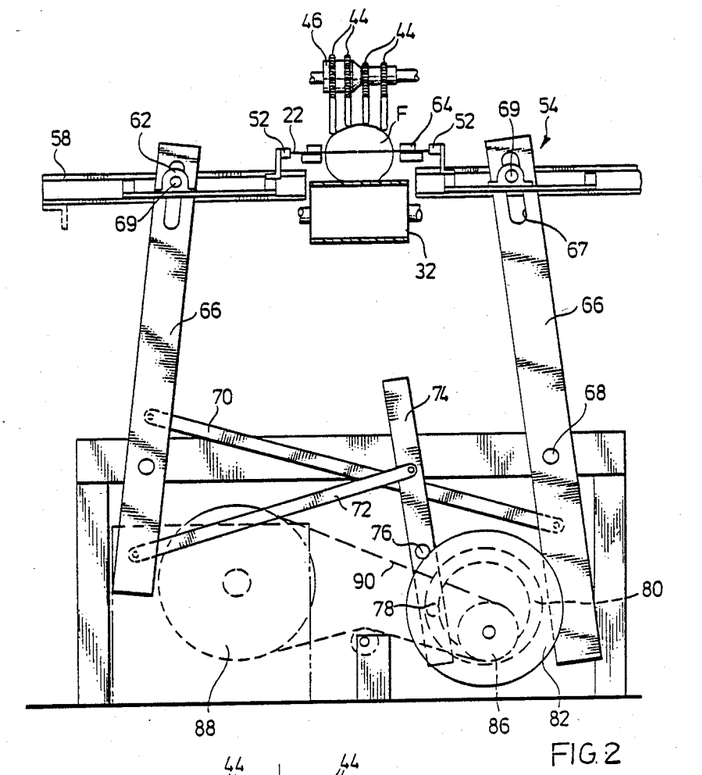
FIG. 2 is a partial section view taken along line 2—2 of FIG. 1 and showing the tines in the advanced position.
Figure 3:
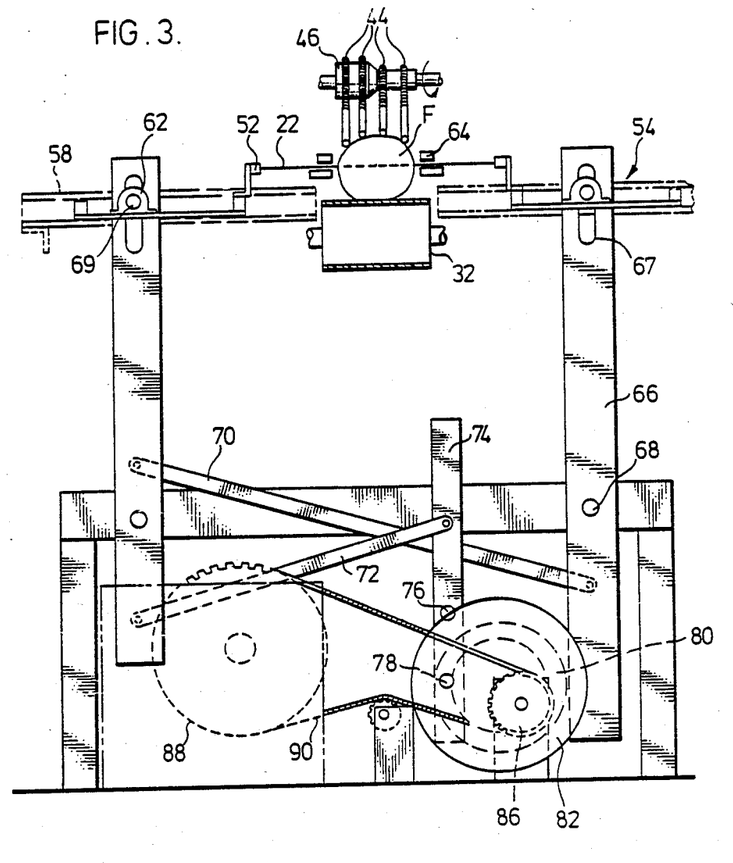
FIG. 3 is a view similar to that of FIG. 2 showing the tines in the retracted position.

It is noted at the outset that FIGS. 1–3 are somewhat simplified views of the apparatus in that they show only a small portion of hold down system 42 and nothing of the horizontal adjustment system, both of which are described in detail with reference to later Figures of the drawings. Referring to the drawings, the tining apparatus 10 includes a support frame 12 (only partly shown) of any suitably rigid construction having an elongated conveyor 14 thereon defining an elongated path of travel along which items of foodstuff F, shown here as crusty loaves having domed tops, are carried in serially arranged relationship. The conveyor is moved at a selected rate of speed by a drive 16. First and second tine sets 18 and 20 are mounted at opposing sides of the conveyor 14 in opposed relation to one another. Each tine set includes a plurality of tines 22 disposed in spaced parallel relation to one another. Tine guide assemblies 24 fixed to support frame 12 are also provided for each of the first and second tine sets for guiding the tines 22 in spaced parallel paths in a common plane lying above the conveyor 14 and fixed relative to the support frame 12. Each of the above-noted tine sets 18 and 20 has a length, measured along the path of conveyor travel, at least equal to a selected plurality of foodstuff lengths or diameters. A tine drive mechanism 26 is provided for advancing and withdrawing in unison the tines 22 of the first and second sets 18 and 20 so that the tines 22 of the two sets move along their respective paths toward and into interdigitating relation with one another and thence away and into spaced apart relation from one another in timed relationship to the conveyor movement. This timed relationship is such that as each item of foodstuff is carried along the path of travel defined by the conveyor 14, the tines 22 of both sets 18, 20 enter into and withdraw from each foodstuff item several times, preferably at least three times, to effect multiple piercing of same.

The conveyor 14 includes a flat endless belt 30, the upper reach of which is horizontally disposed and supported on an elongated flat support plate 31 (FIG. 5), belt 30 being trained around a spaced pair of rolls 32 mounted at opposing ends of conveyor frame 34. One of the rolls 32 is driven in rotation via sprocket 36 which, in turn, is driven from the conveyor drive 16 via sprocket 38 and roller drive chain 40.

In order to prevent random uncontrolled motion of the foodstuff items F as they are carried along the conveyor 14 and to provide incremental rotation of same about axes normal to the conveyor belt 30 between piercing operations, and to assist in ensuring that the plane of weakening provided by the tining or piercing operation is consistently located from one item F to the next, a hold-down system 42 is provided which is located above the conveyor 14. This takes the form of a plurality of endless belts 44 disposed above the conveyor belt 30, the lower reaches of hold-down belts 44 being in spaced parallel relation to the upper reach of the conveyor belt 30 so as to lightly contact the upper surfaces of foodstuff items F supported on conveyor belt 30. Belts 44 are trained around a pair of rollers 46 mounted on brackets fixed to opposing ends of conveyor frame 34, one of such rollers 46 being driven form sprocket 48 via drive chain 50, which, in turn, is driven from a sprocket co-axial with sprocket 36.

As shown in the drawings, two pairs of bold-down belts 44 are provided, a first of such pairs being trained about a large diameter half of each roller 46 and the second of such pairs being trained about the small half of each such roller. Hence, the pairs of belts 44 move at different linear speeds. Since the belts 44 contact the domed upper surfaces of the foodstuff items F, a turning moment of force is applied to each item F as it moves along the conveyor thus causing same to rotate slightly each time the tines 22 are withdrawn. This ensures that the tines penetrate items F at several angles around the periphery of same thereby to ensure easy splitting apart of the final product by the customer.

Figures 7, 8, 9:
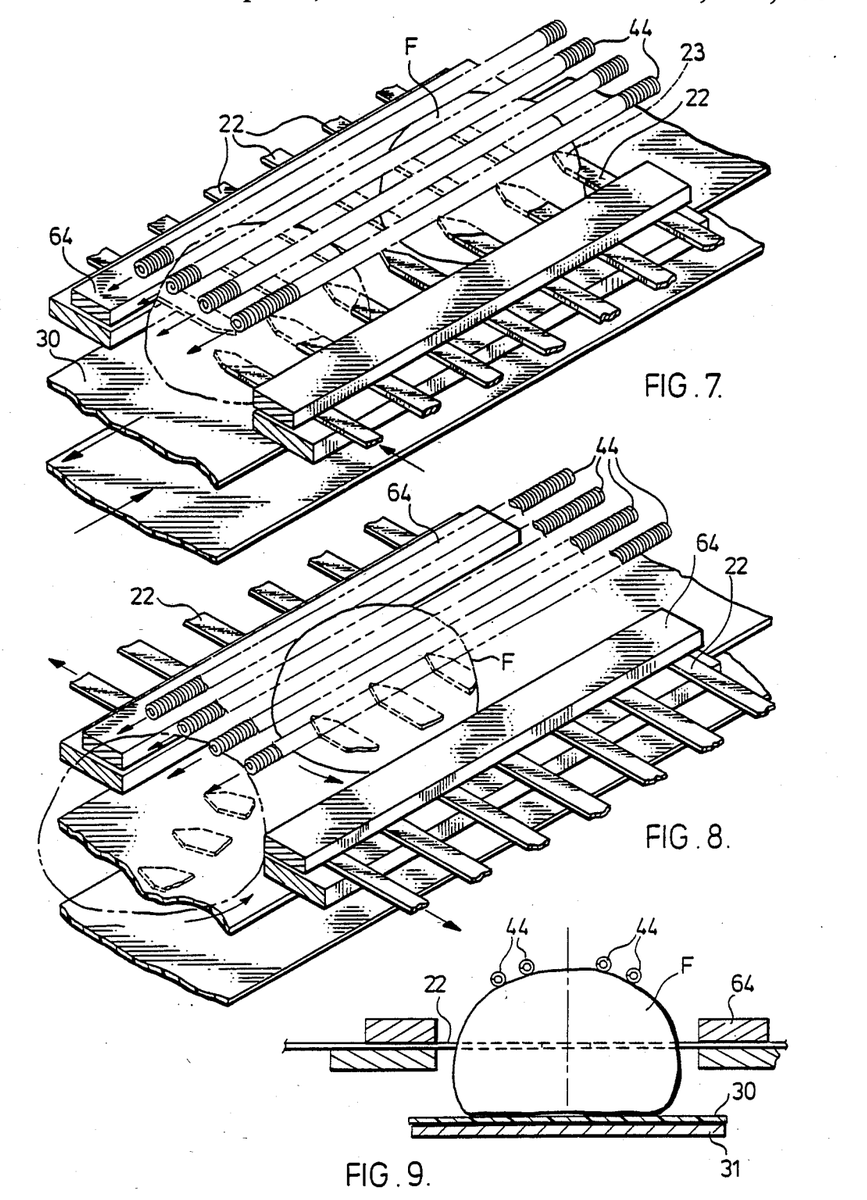
FIGS. 7 and 8 are fragmentary perspective views showing the muffin tining or piercing operation.
FIG. 9 is a partial cross-section view through the conveyor line showing the relative positions of the tines, the food item, conveyor belts, etc., during the piercing operation.

Hold down belts 44 are of the tightly wound resilient coil-spring type commonly used in the bakery industry and the gentle pressure they exert avoids damage to the crust on the foodstuff. This gentle hold down action is further assured by a hold down frame 29 (FIG. 4) located above conveyor frame 34 and extending lengthwise thereof. This frame 29 supports a plurality of vertically movable idler rollers 33 which engage such belts 44 at spaced intervals there along to hold such belts in contact with the foodstuff items while travelling along the conveyor. Each idler roller is provided with a hold down spring 35 selected to provide the desired degree of resiliency. The belts 44 are thus held in embracing relation with the tops of the items F to control the movement of same as best shown in FIG. 9.

Figure 4:
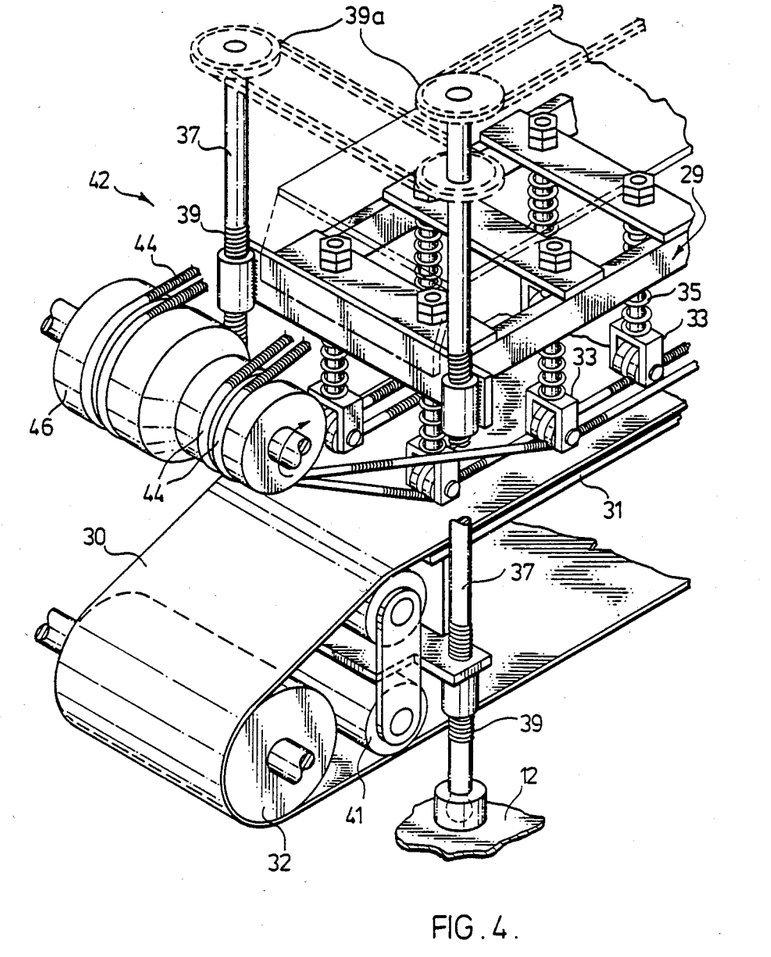
FIGS. 4 and 5 are perspective and elevation views respectively of one end of the conveyor system showing the vertical adjustment means.
Figure 5:
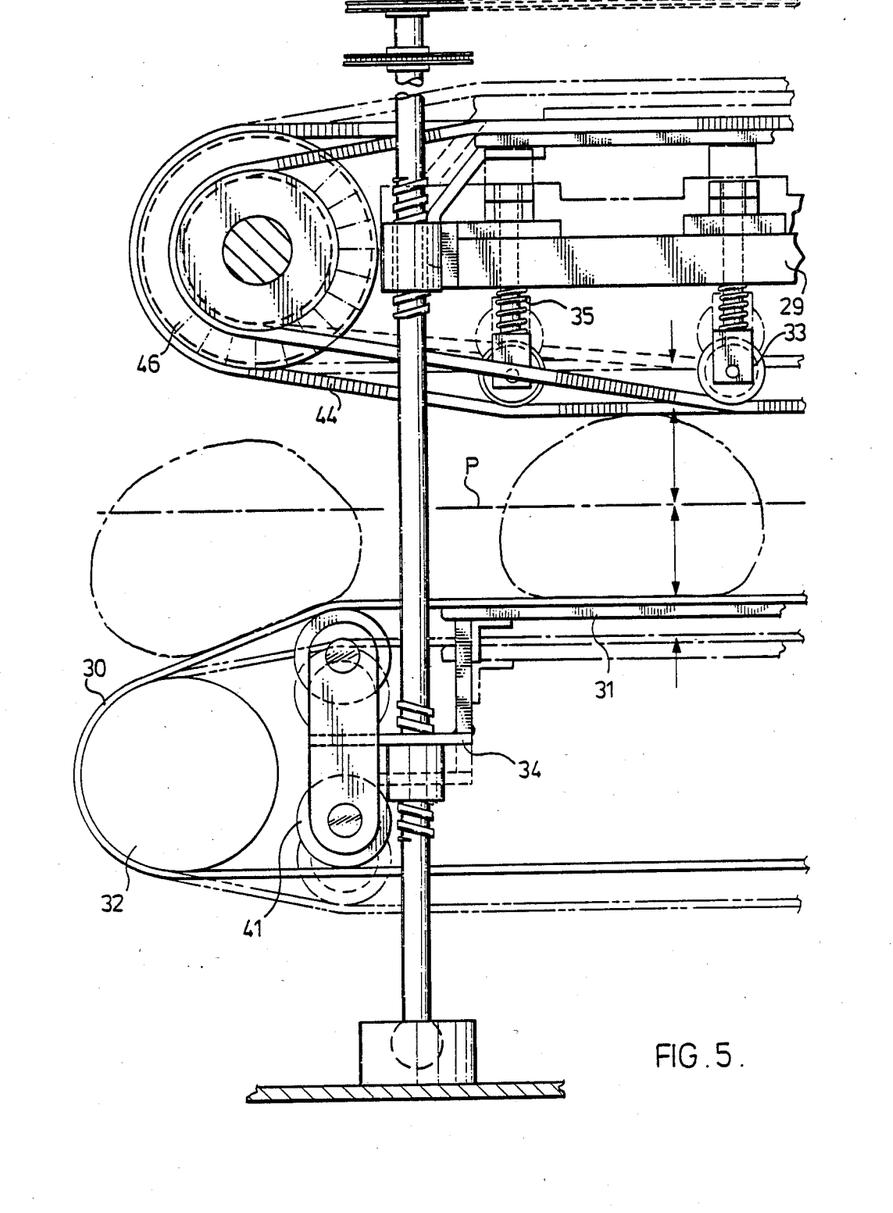

As best seen in FIGS. 4 and 5, the conveyor belt support plate 31 and the hold-down frame 29 are provided with means to adjust the vertical distance between them while at the same time leaving the vertical location of the timing action unchanged. These adjustment means include a pair of spaced vertical shafts 37 at each end of the conveyor line, each shaft 37 provided with spaced apart screw threaded sections 39 of opposite hand to each other, such sections engaged with threaded elements fixed to the hold down frame 29 and support plate 31 such that as the shafts 37 are rotated in unison via chain and sprocket means 39a, the vertical distance between hold-down frame 29 and support plate 31 is increased or decreased. At the same time the location of the tining plane P remains unchanged (see FIG. 5). Likewise, the distance between the tining plane P and each of the support plate 31 and hold down frame 29 is correspondingly increased or decreased simultaneously.

Another item shown in FIGS. 4 and 5 is the use of the spaced idler rolls 41 which are secured to support plate 31 and movable therewith whereby to provide a smooth lead-in to the support plate and to maintain the tension in the conveyor belt 30 as plate 31 is raised or lowered.

The above-noted tine sets 18 and 20 each include a rigid tine bar 52 in which the outer ends of the individual tines 22 are fixed, as by set screws (not shown), or any other suitable means. The individual tines 22 are thin, flat, strip-like elements of steel equipped with pointed V-shaped heads 23 (FIGS. 6-8) with sharp leading edges to enhance the tining action. When using these flat tines, one is not seeking to produce the roughened surface on the interior that is sought after in tine-split English muffins; rather what is sought is a product that stays together after tining around its entire diameter to retain freshness and yet may be pulled apart by the consumer in the manner of a tine-split English muffin. However, if the machine is converted for use with English muffins, the flat tines are replaced with slender rod-like tines, (not shown).

Each tine bar 52 has a length, as noted above, which is several time longer than the foodstuff length or diameter, as, for example, at least ten times longer for reasons to be described hereafter. Each tine bar 52 is mounted to a tine bar carrier 54, each carrier 54 comprising a rectangular frame having spaced parallel members 56, the ends of which being connected by further members (not shown) which are slidably mounted in opposed spaced guide channels 58 mounted to the machine support frame 12. Members 56 are secured to spaced carrier elements 60 which, in turn, serve to mount pivot blocks 62. Shock absorbers 63 mounted on the machine frame absorb impact forces when the carriers 54 reach the outer limits of their travel.

Figure 6:
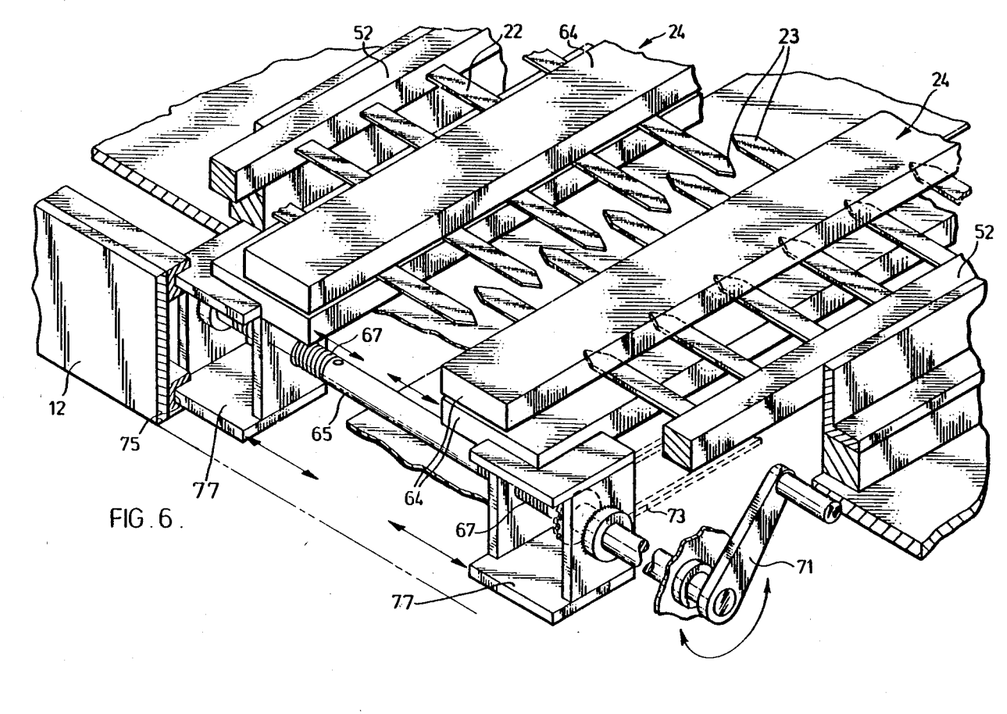
FIG. 6 is a perspective view illustrating the width adjustment for the tine guide assemblies.

The above-noted tine guide assemblies 24 each include a pair of elongated rigid guide members 64, which may be of brass or bronze having a series of slot-like apertures 66 defined there between to slidably receive and guide the respective strip-like tines 22. Thus, as the tine bars 52 and their respective carriers 54 are moved back and forth along the guide channels 58, the tines 22 of each set are moved in unison from retracted positions wherein their tips are flush with or slightly retracted into suitably sized apertures in guide members 64 (see FIG. 8) to advanced interdigitating relation as shown in FIGS. 2, 6 and 7.

When in a fully advanced position, the tines 22 fully penetrate the foodstuff items F and lie in a plane about midway between the upper and lower reaches, respectively, of the conveyor belt 30 and the hold-down belts 44 (FIG. 7). When the foodstuff has thus been penetrated several times, preferably three or four times, a distinct plane of weakness is provided which enables it to be separated into halves quite readily by the ultimate user.

In order to accomodate different widths of foodstuff, the distance between the opposing sets of guide bar members 64 may be varied. For this purpose, both ends of the conveyor line are provided with a rotatable adjustment shaft 65 (FIG. 6) having opposite hand screw threaded sections 67 thereon which engage with respective slide elements 77 mounted to opposing ends of the associated pairs of guide members 64. Hence when shafts 65 are rotated in unison by crank 71 and chain and sprocket means 73, the guide members are moved toward or away from one another, with the slide elements 77 sliding in respective grooved portions 75 fixed to the main frame 12.

The above-noted tine drive mechanism 26 for reciprocating the tine sets 18 and 20 includes opposed drive arms 66 secured at pivot points 68 to the frame 12. The upper ends of arms 66 are slotted at 67 to receive pins 69 which extend through pivot blocks 62, the latter being fixed to the tine bar carriers 54. Arms 66 are interconnected together via link 70 which ensures that they pivot toward and away from one another in unison. A further drive link 72 is connected between one of the arms 66 and a cam follower arm 74, the latter being pivotted to frame 12 via pivot pin 76. Follower arm 74 includes a follower roller 78 which engages in a groove 80 defined in drive cam 82.

Figure 4A:
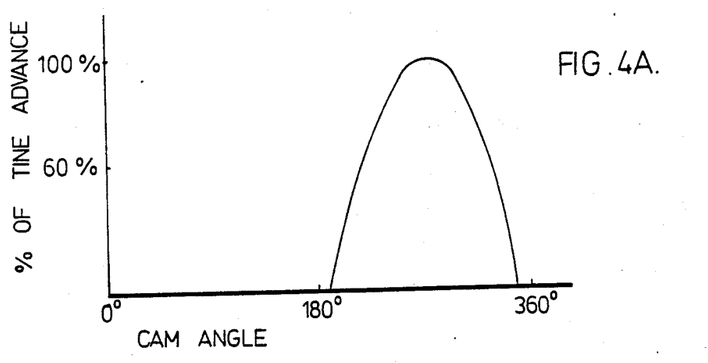
FIG. 4A is a graph illustrating tine position as a function of drive cam angle.

The shape of the drive cam 82 is not particularly critical. However, it should provide reasonably rapid advance and withdrawal of the tines. The graph of FIG. 4A which plots the % advance of the tines as a function of cam angle will provide those skilled in the art with sufficient information as to enable a satisfactory cam and drive linkage mechanism to be produced.

Drive cam 82 is driven in rotation by sprocket 86, the latter being driven from main sprocket 88 via drive chain 90. Sprocket 88 is also driven from drive 16 so there is a predetermined speed relationship between the conveyor speed and the tine drive speed. As noted above, this relationship should be such that the tines 22 are advanced and retracted at a rate related to the rate of movement of the conveyor belt 30 so that the foodstuff items F are pierced at least three times and preferably four times as they move along the conveyor.

The manner of operation of the tining apparatus will be readily apparent from a review of the drawings and the above description. The operator firstly makes the necessary vertical and lateral adjustments depending on the size of the foodstuff item to be tined. As the items F are fed into the inlet end of the conveyor 14 they move until such time as they are penetrated by the tines, as seen in FIGS. 2 and 7 at which point there is a momentary stoppage in flow, it being realized that the conveyor belt moves continually thus sliding beneath the items F when they are stopped.

As soon as the tines 22 are retracted the flow of items F again starts only to be stopped soon after when the items are again pierced by the tines. The length of the tine sets 18 and 20 in conjunction with the speed relationship between the conveyor 14 and the tine drive mechanism 26 assures that the items F are each pierced at least three times before leaving the exit end of the apparatus. The more times the items are pierced, the greater the degree of weakness between the halves of the item.

By virtue of the speed differential between the belts 44, a turning moment is applied to the items F at all times. Hence when the tines withdraw, items F rotate a small amount about axes normal to the conveyor belt before again being pierced by the tines (FIG. 8). Since this action is repeated three or four times for each foodstuff item F, one is assured that each such item is adequately weakened all around its circumference to allow it to be readily split apart by the consumer.

The apparatus described above is capable of operating at a relatively high speed (approximately 220 items per minute). At the same time very few rejects are produced.

The apparatus described above, by virture of its unique simplicity, can be produced for a relatively low cost. At the same time it is very effective in terms of its tining ability and the quality of the foodstuff so processed. The apparatus is flexible and can be used with a variety of sizes and shapes of loaves and buns without damage to the crust of same. With minor modifications English muffins can be processed as well.

Figure 9A:
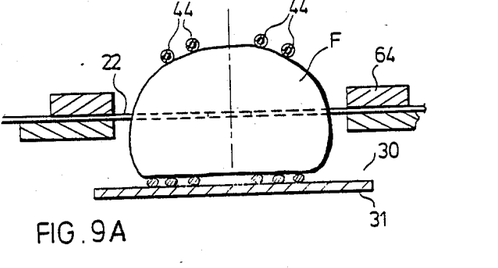
FIG. 9A is a view similar to FIG. 9 but showing a modified conveyor belt arrangement.

A preferred embodiment of the invention has been described by way of example. One modification which has been found to be desirable concerns the hold-down belts 44. In some cases the coil-spring type of belt may sag unduly. In this case a slender round plastic belt, common to the bakery industry, may be used. Although such belt exhibits little if any real elasticity, it still exerts only gentle pressure on the crust of the foodstuff so as to avoid damage. Another modification concerns the replacement of the flat conveyor belt 30 with a plurality of parallel spaced round plastic belts 94 as shown in FIG. 9A. As illustrated in FIG. 9A six belts 94 are arranged in two pairs of three each and are trained around rollers (not shown) similar to roller 46, so that the speed differential between the upper pairs of belts 44 and the lower pairs 94 is identical. The result is that the foodstuff items F are given a more positive form of incremental rotation than in the previously described arrangement employing flat belt 30 and roller 32. A still further modification concerns the replacement of the mechanical cam, link, and lever tine drive mechanism with a solenoid activated pneumatic system (not shown). Numerous other modifications and variations falling within the spirit and scope of the invention will be apparent to those skilled in this art in the light of the present disclosure and hence reference is to be had to the appended claims in determining the scope of the invention.

I claim:

1. Apparatus for tining bakery foodstuffs such as rolls and loaves comprising:
   (a) a support frame;
   (b) a conveyor on said frame for transporting items of the foodstuff in serially arranged relationship along an elongated path of travel defined by said conveyor;
   (c) a conveyor drive for moving said conveyor at a selected rate of speed;
   (d) first and second tine sets mounted at opposite sides of the conveyor in opposing relationship to one another, each tine set including a plurality of tines located in spaced parallel relationship to one another;
   (e) tine guide means for each of the first and second tine sets for guiding said plurality of tines as they are moved toward and away from one another;
   (f) tine drive means for advancing and withdrawing the tines of said first and second sets so that said tines move toward and away from one another along their respective paths such that as each item of foodstuff is carried along the path of travel by the conveyor it is pierced a plurality of times by said tines of said sets; and
   (g) means for contacting the foodstuff items as they are moved along the path of travel by the conveyor to effect incremental rotation thereof about axes normal to said conveyor during the intervals of time that the tines are withdrawn from such items so that said tines enter the items at several angularly spaced locations on each item.

2. Apparatus according to claim 1 wherein said means for contacting the foodstuff items include belt means spaced above and extending along said conveyor.

3. Apparatus according to claim 2 wherein a plurality of said belt means are provided, spaced apart across the width of said conveyor, and means for moving said belt means at different speeds so as to impart torque to the foodstuff items and effect the incremental rotation thereof.

4. Apparatus according to claim 3 wherein said belt means are arranged to impart only gentle pressure to the items of foodstuff.

5. Apparatus according to claim 4 wherein said conveyor includes a belt arrangement on which said items are supported and carried along the path of travel, said conveyor belt arrangement also comprising two pairs of belts and means for moving same with a speed differential corresponding to that of said belt means so as to enhance the amount of torque imparted to the foodstuff items.

6. Apparatus according to claim 5 wherein two pairs of said belt means are provided, and resilient pressure applying means associated with said pairs of belt means so that the two pairs of belt means are capable of partially embracing domes upper portions of foodstuff items passing along the conveyor.

7. Apparatus according to claim 1 wherein said tine guide means serve to guide said tines in spaced parallel paths fixed relative to said support frame, such parallel paths lying above said conveyor, and wherein each said tine set has a length measured along the path of travel at least equal to a selected plurality of diameters or lengths of the foodstuff item.

8. Apparatus according to claim 2 wherein said conveyor includes a belt arrangement on which said items are supported and carried along the path of travel, means for adjusting the distance between said belt arrangement of the conveyor and said belt means to accommodate differing heights of foodstuff, and means to adjust the distance between said tine guide means to accommodate differing widths of foodstuff.

9. Apparatus according to claim 1 wherein each of said plurality of tines comprises a flattened blade having a sharpened end.

10. Apparatus according to claim 1 wherein the spaced parallel paths of tine movement are generally transverse to the path of conveyor travel, said parallel paths also lying in a common plane above said conveyor, the tine drive means adapted to advance and withdraw the tines of the first and second sets in unison.

11. Apparatus for tining bakery foodstuffs such as rolls or loaves comprising:
(a) a support frame;
(b) a conveyor on said frame for transporting items of the foodstuff in serially arranged relationship along an elongated path of travel defined by said conveyor;
(c) a conveyor drive for moving said conveyor at a selected rate of speed;
(d) first and second tine sets mounted at opposite sides of the conveyor in opposing relationship to one another, each tine set including a plurality of tines located in spaced parallel relationship to one another;
(e) tine guide means for each of the first and second tine sets for guiding said plurality of tines as they are moved toward and away from one another in spaced parallel paths fixed relative to said support frame, said parallel paths lying above said conveyor;
(f) each tine set having a length measured along the path of conveyor travel at least equal to a selected plurality of diameters or lengths of the foodstuff item;
(g) tine drive means for advancing and withdrawing the tines of said first and second sets so that said tines move toward and away from one another along their respective paths in a fixed tining plane in timed relationship to said conveyor movement such that as each item of foodstuff is carried along the path of travel by the conveyor it is pierced a plurality of times by said tines of said sets; and
(h) hold-down belt means spaced above and extending along said conveyor for contacting surfaces of the foodstuff items to stabilize same and prevent random uncontrolled movement thereof while being carried along the path of travel by the conveyor;
(i) said conveyor including a generally horizontal belt arrangement on which said items are supported and carried along the path of travel, and means for simultaneously increasing or decreasing the vertical distance between said fixed tining plane and both said belt arrangement of the conveyor and said hold down belt means to accommodate differing sizes of foodstuff while at the same time the vertical location at which said tines penetrate the foodstuff remains unchanged.

12. Apparatus according to claim 11 further including means to adjust the horizontal distance between said tine guide means to accommodate differing widths of foodstuff.

13. Apparatus according to claim 11 wherein two pairs of said hold-down belt means are provided, said pairs of hold-down belt means being resilient, and resilient pressure applying means associated with said pairs of hold-down belt means so that the two pairs of hold-down belt means are capable of partially embracing the domed upper portions of foodstuff items passing along the conveyor.

14. Apparatus according to claim 11 wherein said hold-down belt means for contacting the foodstuff items are also adapted to effect incremental rotation of the foodstuff items about axes normal to said conveyor while passing along said path of travel so that said tines enter the items at several angularly spaced locations on each item.

15. Apparatus according to claim 11 wherein a plurality of said hold-down belt means are provided, spaced apart across the width of said conveyor, and means for moving said hold-down belt means at different speeds so as to impart torque to the foodstuff items and effect incremental rotation thereof.

16. Apparatus according to claim 15 wherein said hold-down belt means are elastic to thus impart only gentle pressure to the items of foodstuff.

17. Apparatus according to claim 11 wherein each of said plurality of tines comprises a flattened blade having a sharpened end.

18. Apparatus for tining bakery products such as crusty rolls, loaves and other related foodstuffs comprising:
(a) a support frame,
(b) a conveyor on said frame for transporting items of the foodstuff in serially arranged relationship along an elongated path of travel defined by said conveyor;
(c) a conveyor drive for moving said conveyor at a selected rate of speed;
(d) first and second tine sets mounted at opposite sides of the conveyor in opposing relationship to one another, each tine set including a plurality of tines located in spaced parallel relationship to one another;

(e) tine guide means for each of the first and second tine set for guiding said plurality of tines as they are moved toward and away from one another in spaced parallel paths fixed relative to said support frame, said parallel paths lying above said conveyor;

(f) each tine set having a length measured along the path of conveyor travel at least equal to a selected plurality of diameters or lengths of the foodstuff item;

(g) tine drive means for advancing and withdrawing the tines of said first and second sets so that said tines move toward and away from one another along their respective paths in timed relationship to said conveyor movement such that as each item of foodstuff is carried along the path of travel by the conveyor it is pierced a plurality of times by said tines of said sets;

(h) hold-down belt means spaced above and extending above said conveyor for contacting surfaces of the foodstuff items to stabilize same and prevent random uncontrolled movement thereof while being carried along the path of travel by the conveyor;

(i) and resilient pressure applying means associated with said hold-down belt means so that the hold-down belt means are capable of gently contacting the upper portions of the foodstuff items passing along the conveyor to control the motion thereof.

19. Apparatus according to claim 18 including means for moving selected ones of said hold-down belt means at different speeds so as to impart torque to the foodstuff items and effect incremental rotation thereof.

20. Apparatus according to claim 18 wherein said belt means are elastic to thus impart only gentle pressure to the items of foodstuff.

21. Apparatus according to claim 18, said conveyor including a belt arrangement on which said items are supported and carried along the path of travel, and means for adjusting the vertical distance between said belt arrangement of the conveyor and said belt means to accommodate differing sizes of foodstuff while at the same time the vertical location at which said tines penetrate the foodstuff remains unchanged.

22. Apparatus according to claim 21 further including means to adjust the distance between said tine guide means to accommodate differing widths of foodstuff.

23. Apparatus according to claim 21 wherein said belt means are arranged to partially embrace domed upper portions of the foodstuff items to control the movement of same.

* * * * *